United States Patent
Zhang (10) Patent No.: US 11,875,932 B2
(45) Date of Patent: Jan. 16, 2024

(54) WIRELESS CHARGING COIL AND TERMINAL DEVICE

(71) Applicant: VIVO MOBILE COMMUNICATION CO., LTD., Guangdong (CN)

(72) Inventor: Jun Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 449 days.

(21) Appl. No.: 17/211,913

(22) Filed: Mar. 25, 2021

(65) Prior Publication Data

US 2021/0210283 A1 Jul. 8, 2021

Related U.S. Application Data

(63) Continuation-in-part of application No. PCT/CN2019/107754, filed on Sep. 25, 2019.

(30) Foreign Application Priority Data

Sep. 29, 2018 (CN) .......................... 201811146486.4

(51) Int. Cl.
*H01F 38/14* (2006.01)
*H01F 27/28* (2006.01)
(Continued)

(52) U.S. Cl.
CPC ......... *H01F 38/14* (2013.01); *H01F 27/2823* (2013.01); *H02J 7/02* (2013.01); *H02J 50/10* (2016.02)

(58) Field of Classification Search
None
See application file for complete search history.

(56) References Cited

U.S. PATENT DOCUMENTS 5,430,247 A 7/1995 Bockelman
6,380,835 B1 4/2002 Lee
(Continued)

FOREIGN PATENT DOCUMENTS

CN 101409429 A 4/2009
CN 101810062 A 8/2010
(Continued)

OTHER PUBLICATIONS

Supplementary European Search Report regarding Patent Application No. 19865562.3-1212/3859759; PCT/CN2019/107754, dated Jan. 7, 2022.
(Continued)

*Primary Examiner* — Leigh M Garbowski
(74) *Attorney, Agent, or Firm* — Harness, Dickey & Pierce, P.L.C.

(57) ABSTRACT

A wireless charging coil includes a first wire and a second wire, and the first wire and the second wire are both spirally wound into coils. The first wire includes a first wire part and a second wire part that are connected to each other, and the second wire includes a third wire part and a fourth wire part that are connected to each other. The first wire part is located in a first layer, the second wire part is located in a second layer, the third wire part is located in the first layer, and the fourth wire part is located in the second layer. The first layer and the second layer are two adjacent layers.

12 Claims, 5 Drawing Sheets

(51) Int. Cl.
    *H02J 50/10*     (2016.01)
    *H02J 7/02*     (2016.01)

(56) References Cited

U.S. PATENT DOCUMENTS

| | | | |
|---|---|---|---|
| 7,973,635 B2* | 7/2011 | Baarman | H01F 27/2804 |
| | | | 336/200 |
| 2009/0085706 A1 | 4/2009 | Baarman et al. | |
| 2017/0243691 A1 | 8/2017 | Stewing et al. | |
| 2021/0012959 A1 | 1/2021 | Pei et al. | |
| 2021/0151247 A1* | 5/2021 | Zhu | H01F 27/2871 |

FOREIGN PATENT DOCUMENTS

| | | | | |
|---|---|---|---|---|
| CN | 203826973 U | | 9/2014 | |
| CN | 206023383 U | | 3/2017 | |
| CN | 106849554 A | | 6/2017 | |
| CN | 108565102 A | | 9/2018 | |
| CN | 109215978 A | * | 1/2019 | H01F 27/28 |
| WO | WO-9506955 A1 | | 3/1995 | |

OTHER PUBLICATIONS

International Search Report and Written Opinion of the International Searching Authority regarding International Patent Application No. PCT/CN2019/107754, dated Dec. 24, 2019. Translation provided by Bohui Intellectual Property.

First Office Action regarding Chinese Patent Application No. 201811146486.4, dated Nov. 20, 2019. Translation provided by Bohui Intellectual Property.

Second Office Action regarding Chinese Patent Application No. 201811146486.4, dated Apr. 23, 2020. Translation provided by Bohui Intellectual Property.

* cited by examiner

WIRELESS CHARGING COIL AND TERMINAL DEVICE

CROSS-REFERENCE TO RELATED APPLICATIONS

This application is a Bypass Continuation-in-Part Application of PCT/CN2019/107754 filed on Sep. 25, 2019, which claims priority to Chinese Patent Application No. 201811146486.4 filed on Sep. 29, 2018, which are incorporated herein by reference in their entirety.

TECHNICAL FIELD

The present disclosure relates to the field of wireless charging technologies, and in particular, to a wireless charging coil and a terminal device.

BACKGROUND

As wireless charging technologies are developed rapidly, wireless charging is applied to a terminal device more and more widely. Compared with wired charging, the wireless charging has better security and convenience, and an electronic device having a wireless charging function is very popular among users.

However, during wireless charging, due to a skin effect and a proximity effect, when a current flows through a wireless charging coil, a current density is distributed unevenly, and an effective area of the wireless charging coil through which the current flows is reduced, so that an AC effective impedance of the wireless charging coil through which the current flows is increased, and charging efficiency is relatively low.

SUMMARY

According to a first aspect, an embodiment of the present disclosure provides a wireless charging coil, including: a first wire and a second wire, where the first wire and the second wire are both spirally wound into coils, where
the first wire includes a first wire part and a second wire part that are connected to each other, and the second wire includes a third wire part and a fourth wire part that are connected to each other;
the first wire part is located in a first layer, the second wire part is located in a second layer, the third wire part is located in the first layer, and the fourth wire part is located in the second layer; and
the first layer and the second layer are two adjacent layers.

According to a second aspect, an embodiment of the present disclosure further provides a terminal device, including the foregoing wireless charging coil.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Figure 1A:
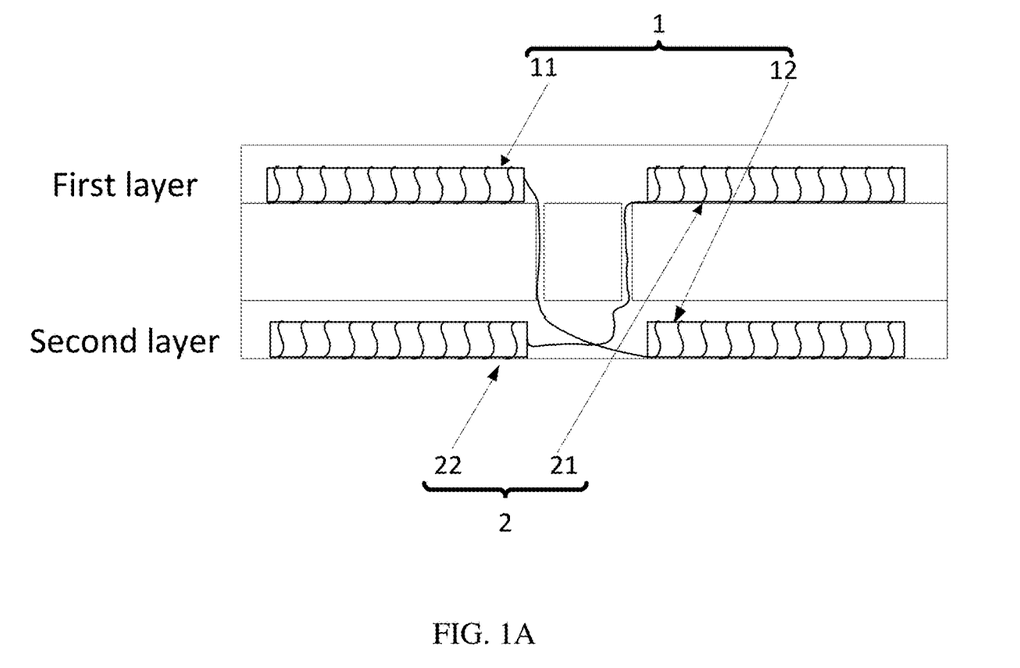
FIG. 1A is a schematic structural diagram of a wireless charging coil according to the embodiments of the present disclosure.
Figure 1B:
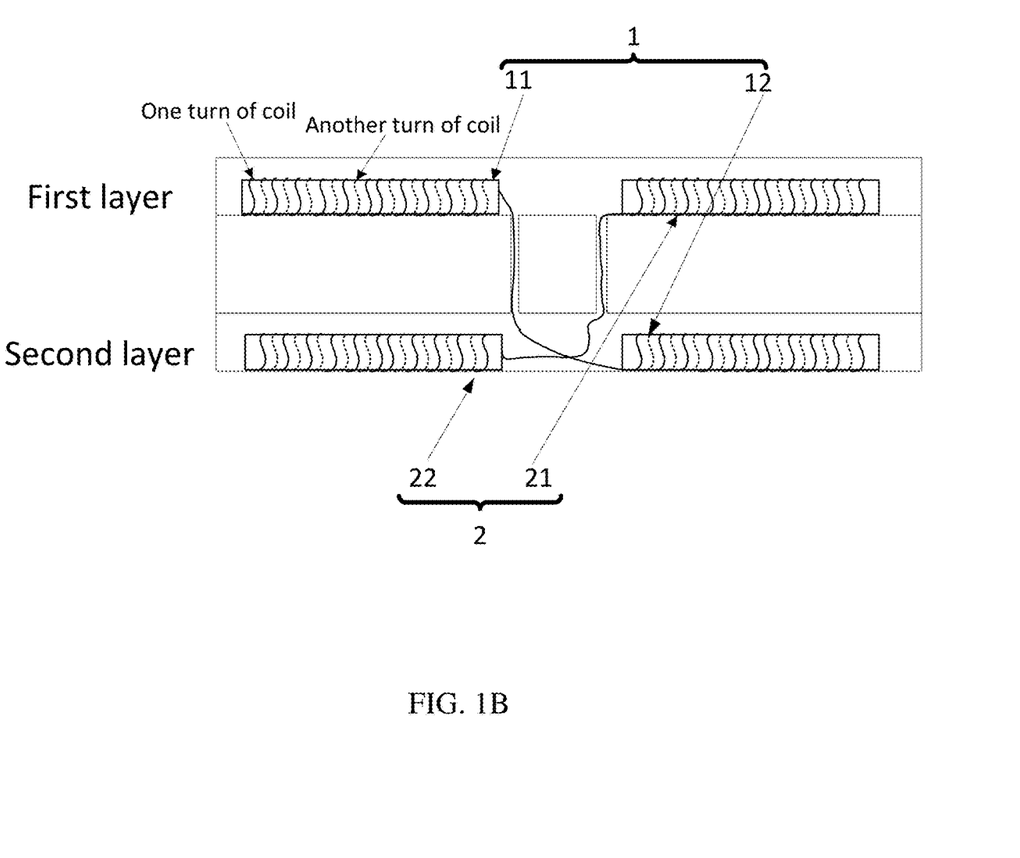
FIG. 1B is a schematic structural diagram of another wireless charging coil according to the embodiments of the present disclosure.
Figure 1C:
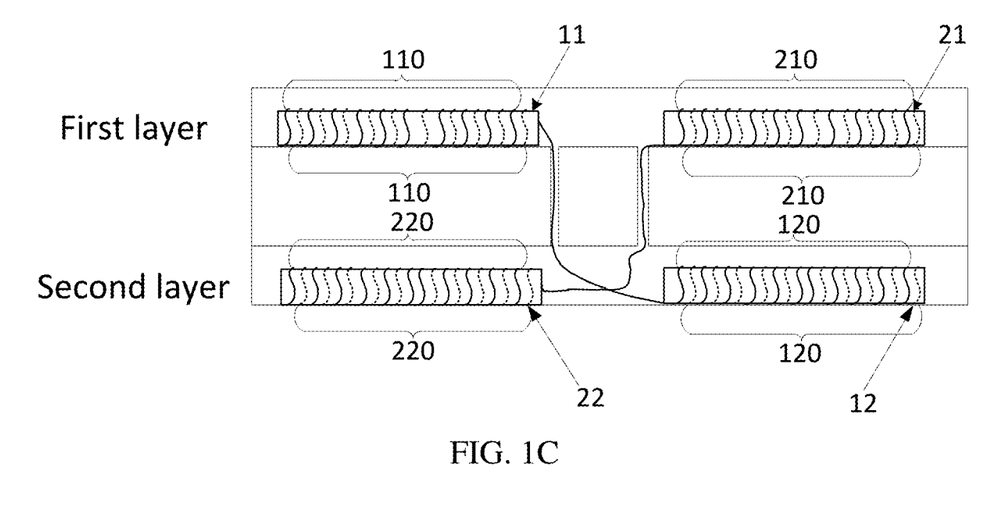
FIG. 1C is a schematic structural diagram of yet another wireless charging coil according to the embodiments of the present disclosure.

FIGS. 1A to 1C are schematic structural diagrams of a wireless charging coil according to the embodiments of the present disclosure. As shown in FIGS. 1A to 1C, the wireless charging coil includes: a first wire 1 and a second wire 2, where the first wire 1 and the second wire 2 are both spirally wound into coils; the first wire 1 includes a first wire part 11 and a second wire part 12 that are connected to each other, and the second wire 2 includes a third wire part 21 and a fourth wire part 22 that are connected to each other; the first wire part 11 is located in a first layer, the second wire part 12 is located in a second layer, the third wire part 21 is located in the first layer, and the fourth wire part 22 is located in the second layer; and the first layer and the second layer are two adjacent layers.

Figure 2:
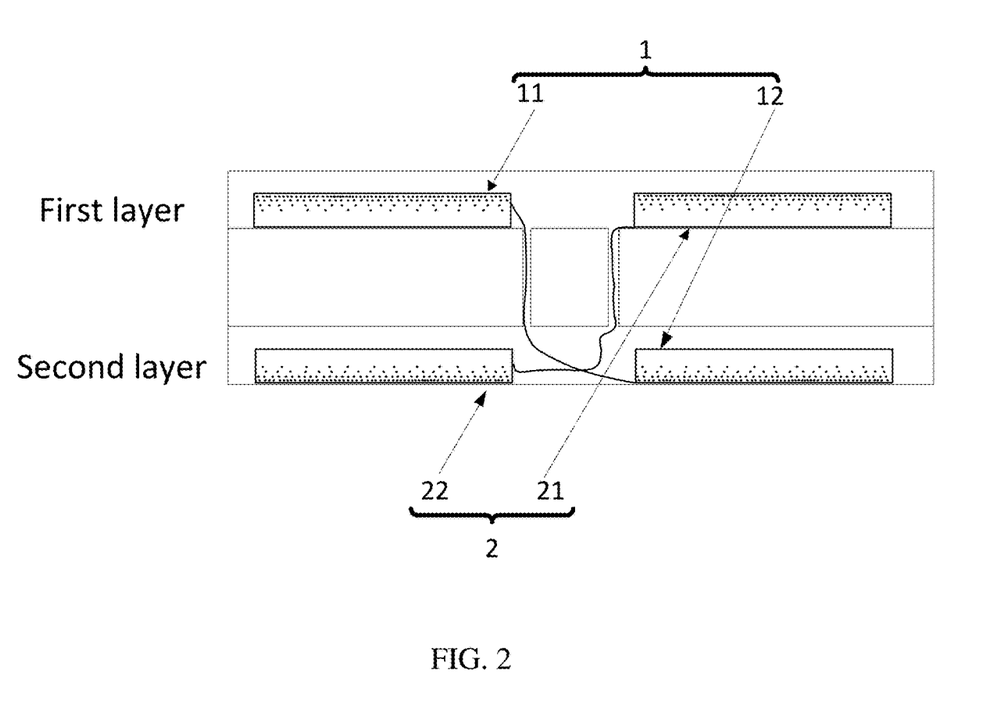
FIG. 2 is a schematic diagram of current densities of wires according to the embodiments of the present disclosure.

As shown in FIG. 2, the first wire part 11 of the first wire 1 is located in the first layer, and the second wire part 12 of the first wire 1 is located in the second layer. Because the first wire part 11 of the first layer and the fourth wire part 22 of the second layer may have a proximity effect, a current density on an upper side of the first wire part 11 may be increased, and a current density on a lower side of the first wire part 11 may be decreased (the denser the dots, the larger the current density; the more sparse the dots are, the smaller the current density is).

Because the second wire part 12 of the second layer and the third wire part 21 of the first layer may also have a proximity effect, a current density on an upper side of the second wire part 12 may be decreased, and a current density on a lower side of the second wire part 12 may be increased. In this way, the current density on the upper side of the first wire part 11 of the first wire 1 is large, and the current density on the lower side of the first wire part 11 of the first wire 1 is small; and the current density on the upper side of the second wire part 12 is small, and the current density on the lower side of the second wire part 12 is large. Therefore, a total current density in the first wire 1 is evenly distributed as far as possible, an AC effective impedance of the wireless charging coil is reduced, and charging efficiency is improved.

Likewise, the current density on the upper side of the third wire part 21 of the second wire 2 is large, and the current density on the lower side of the third wire part 21 of the second wire 2 is small; and the current density on the upper side of the fourth wire part 22 is small, and the current density on the lower side of the fourth wire part 22 is large. Therefore, a total current density in the second wire 2 is evenly distributed as far as possible, an AC effective impedance of the wireless charging coil is reduced, and charging efficiency is improved.

In this embodiment, the first wire part 11 and the second wire part 12 of the first wire 1 may be connected through a via hole, and the third wire part 21 and the fourth wire part 22 of the second wire 2 may also be connected through a via hole.

To better understand the total current densities of the first wire 1 and the second wire 2, refer to FIG. 2. FIG. 2 is a schematic diagram of current densities of wires according to an embodiment of the present disclosure. It can be learned from FIG. 2 that after the first wire 1 and the second wire 2 are arranged in this manner, the total current density of the first wire 1 is equivalent to being evenly distributed, and the total current density of the second wire 2 is equivalent to being evenly distributed.

In this embodiment, the foregoing terminal device may be a mobile phone, a tablet computer, a laptop computer, a personal digital assistant (personal digital assistant, PDA), a mobile Internet device (Mobile Internet Device, MID), a wearable device, or the like.

In some embodiments of the present disclosure, as shown in FIG. 1B, the first wire 1 includes M turns of coils, the second wire 2 includes M turns of coils, and M is an integer greater than zero.

In this embodiment, the foregoing first wire 1 and second wire 2 each include M turns of coils, so that the first wire 1 may well match the second wire 2 in an "interleaving" manner. In addition, the M turns of coils may be a plurality of turns of coils, which may improve wireless charging efficiency. It should be noted that a value of M may be determined based on actual requirements. This is not limited in this embodiment.

In some embodiments of the present disclosure, as shown in FIG. 1C, each turn of coil in the first wire 1 includes a first coil part 110 and a second coil part 120, and each turn of coil in the second wire 2 includes a third coil part 210 and a fourth coil part 220; and the first coil part 110 is included in the first wire part 11, the second coil part 120 is included in the second wire part 12, the third coil part 210 is included in the third wire part 21, and the fourth coil part 220 is included in the fourth wire part 22.

In this embodiment, each turn of coil in the foregoing first wire 1 includes the first coil part 110 and the second coil part 120. The first coil part 110 is included in the first wire part 11, that is, the first coil part 110 is located in the first layer; and the second coil part 120 is included in the second wire part 12, that is, the second coil part 120 is located in the second layer. In this way, each turn of coil in the first wire 1 has a part that is located in the first layer and a part that is located in the second layer. Therefore, a total current density of each turn of coil may be evenly distributed as far as possible, an AC effective impedance of the wireless charging coil may be further reduced, and charging efficiency may be improved.

Likewise, each turn of coil in the second wire 2 has a part that is located in the first layer and a part that is located in the second layer. Therefore, a total current density of each turn of coil may be evenly distributed as far as possible, an AC effective impedance of the wireless charging coil may be further reduced, and charging efficiency may be improved.

In some embodiments of the present disclosure, a length of the first wire part 11 is the same as a length of the second wire part 12; and a length of the third wire part 21 is the same as a length of the fourth wire part 22.

In this embodiment, the length of the foregoing first wire part 11 is the same as the length of the second wire part 12. Therefore, a total current density in the first wire 1 may be evenly distributed as far as possible, an AC effective impedance of the wireless charging coil may be further reduced, and charging efficiency may be improved.

In this embodiment, the length of the foregoing third wire part 21 is the same as the length of the fourth wire part 22. Therefore, a total current density in the second wire 2 is evenly distributed as far as possible, an AC effective impedance of the wireless charging coil is further reduced, and charging efficiency is improved.

In some embodiments of the present disclosure, the first wire 1 includes at least two first wire parts 11 and at least two second wire parts 12, and any two adjacent wire parts of the first wire 1 are different wire parts.

In this embodiment, the foregoing first wire 1 includes at least two first wire parts 11 and at least two second wire parts 12, and any two adjacent wire parts of the first wire 1 are different wire parts. In this way, the at least two first wire parts 11 are located in the first layer, the at least two second wire parts 12 are located in the second layer, and any two adjacent wire parts are different wire parts. Therefore, a total current density in the first wire 1 may be evenly distributed as far as possible, an AC effective impedance of the wireless charging coil may be further reduced, and charging efficiency may be improved.

In some embodiments of the present disclosure, the second wire 2 includes at least two third wire parts 21 and at least two fourth wire parts 22, and any two adjacent wire parts of the second wire 2 are different wire parts.

In this embodiment, the foregoing second wire 2 includes at least two third wire parts 21 and at least two fourth wire parts 22, and any two adjacent wire parts of the second wire 2 are different wire parts. In this way, the at least two third wire parts 21 are located in the first layer, the at least two fourth wire parts 22 are located in the second layer, and any two adjacent wire parts are different wire parts. Therefore, a total current density in the second wire 2 is evenly distributed as far as possible, an AC effective impedance of the wireless charging coil is further reduced, and charging efficiency is improved.

In some embodiments of the present disclosure, any wire part in the first wire 1 includes a first section of wire part and a second section of wire part, the first section of wire part and the second section of wire part each include at least two strands of sub-wires, an a-th strand of sub-wire of the first section of wire part and a b-th strand of sub-wire of the second section of wire part are connected to each other, a and b are both positive integers, and a is not equal to b.

Figure 3:
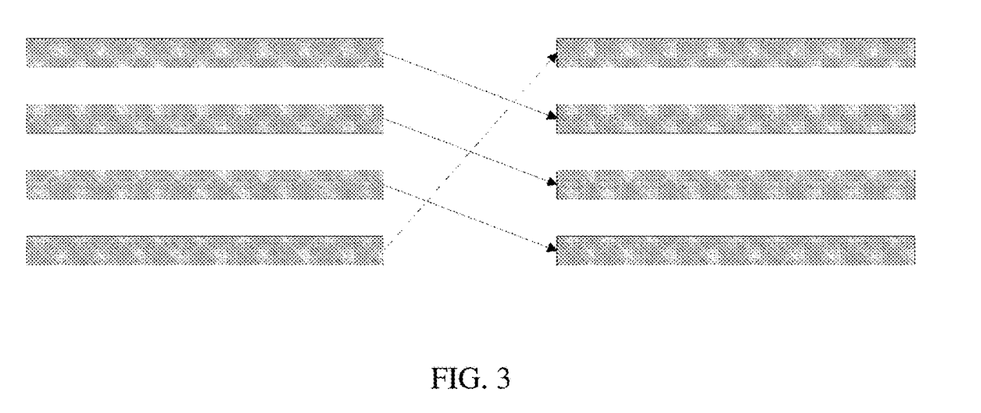
FIG. 3 is a schematic diagram of a wire connection manner according to the embodiments of the present disclosure.
Figure 4:
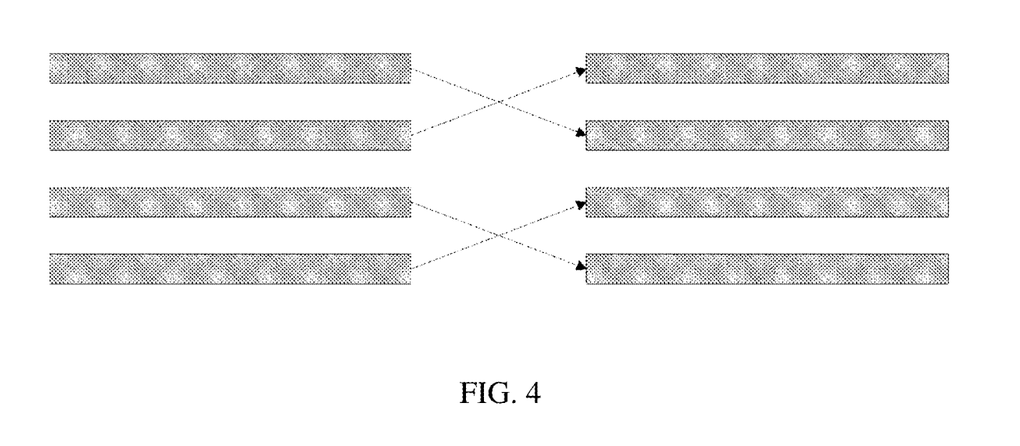
FIG. 4 is another schematic diagram of a wire connection manner according to the embodiments of the present disclosure.

In this embodiment, to better understand the foregoing setting method, refer to FIG. 3 and FIG. 4. Each of FIG. 3 and FIG. 4 is a schematic diagram of a wire connection manner according to an embodiment of the present disclosure. It can be learned from FIG. 3 that any wire part in the first wire 1 includes a first section of wire part and a second section of wire part. The first section of wire part is a wire part in a left column, and the second section of wire part is a wire part in a right column. It should be noted that the first section of wire part and the second section of wire part are wire parts located in the same layer.

The first section of wire part and the second section of wire part each include four strands of sub-wires, and a first strand of sub-wire, a second strand of sub-wire, a third strand of sub-wire, and a fourth strand of sub-wire of the first section of wire part are respectively connected to a second strand of sub-wire, a third strand of sub-wire, a fourth strand of sub-wire, and a first strand of sub-wire of the second section of wire part.

Certainly, in addition to this connection manner, reference may also be made to the connection manner in FIG. 4. In FIG. 4, a first strand of sub-wire and a second strand of sub-wire of the first section of wire part are respectively connected to a second strand of sub-wire and a first strand of sub-wire of the second section of wire part, and a third strand of sub-wire and a fourth strand of sub-wire of the first section of wire part are respectively connected to a fourth strand of sub-wire, and a third strand of sub-wire of the second section of wire part.

In this embodiment, the foregoing first section of wire part and second section of wire part each include at least two strands of sub-wires, and an a-th strand of sub-wire of the first section of wire part and a b-th strand of sub-wire of the second section of wire part are connected to each other, so that a skin effect of the first wire 1 is reduced. Therefore, a total current density in the first wire 1 may be evenly distributed as far as possible, an AC effective impedance of the wireless charging coil may be further reduced, and charging efficiency may be improved.

In some embodiments of the present disclosure, any wire part in the second wire includes a third section of wire part and a fourth section of wire part, the third section of wire part and the fourth section of wire part each include at least two strands of sub-wires, a c-th strand of sub-wire of the third section of wire part and a d-th strand of sub-wire of the fourth section of wire part are connected to each other, c and d are both positive integers, and c is not equal to d.

In this embodiment, for understanding, reference may be made to that any wire part in the first wire includes a first section of wire part and a second section of wire part. Principles are the same, and details are not described herein again. It should be noted that the third section of wire part and the fourth section of wire part are wire parts located in the same layer.

In this embodiment, the foregoing third section of wire part and fourth section of wire part each include at least two strands of sub-wires, and a c-th strand of sub-wire of the third section of wire part and a d-th strand of sub-wire of the fourth section of wire part are connected to each other, so that a skin effect of the second wire 2 is reduced. Therefore, a total current density in the second wire 2 may be evenly distributed as far as possible, an AC effective impedance of the wireless charging coil may be further reduced, and charging efficiency may be improved. Certainly, in addition to this, a multi-layer circuit board and the like may also be disposed. This is not limited in this embodiment.

A wireless charging coil in an embodiment of the present disclosure includes: a first wire 1 and a second wire 2, where the first wire 1 and the second wire 2 are both spirally wound into coils; the first wire 1 includes a first wire part 11 and a second wire part 12 that are connected to each other, and the second wire 2 includes a third wire part 21 and a fourth wire part 22 that are connected to each other; the first wire part 11 is located in a first layer, the second wire part 12 is located in a second layer, the third wire part 21 is located in the first layer, and the fourth wire part 22 is located in the second layer; and the first layer and the second layer are two adjacent layers. In this way, the first wire 1 and the second wire 2 both have parts in the first layer and the second layer, so that total current densities of the wires are evenly distributed, an AC effective impedance of the wireless charging coil is reduced, and charging efficiency is improved.

Figure 5:
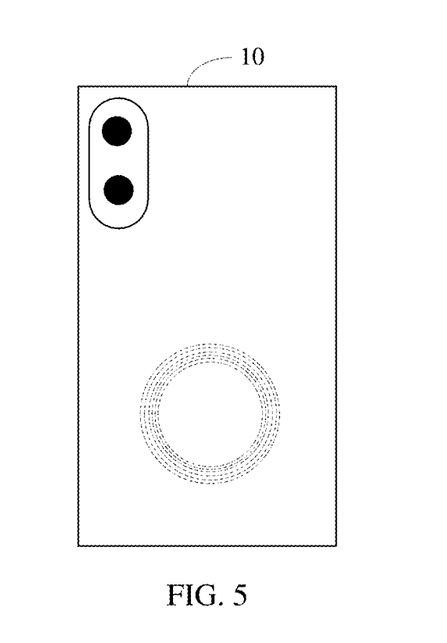
FIG. 5 is a schematic structural diagram of a terminal device according to the embodiments of the present disclosure.

As shown in FIG. 5, an embodiment of the present disclosure further provides a terminal device 10 including the foregoing wireless charging coil.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a" does not exclude presence of other identical elements in the process, method, article, or apparatus that includes the very element.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

What is claimed is:

1. A wireless charging coil, comprising: a first wire and a second wire, wherein the first wire and the second wire are both spirally wound into coils;
    the first wire comprises a first wire part and a second wire part that are connected to each other, and the second wire comprises a third wire part and a fourth wire part that are connected to each other;
    the first wire part is located in a first layer, the second wire part is located in a second layer, the third wire part is located in the first layer, and the fourth wire part is located in the second layer; and
    the first layer and the second layer are two adjacent layers;
    any wire part in the first wire comprises a first section of wire part and a second section of wire part, the first section of wire part and the second section of wire part each comprise at least two strands of sub-wires, an a-th strand of sub-wire of the first section of wire part and a b-th strand of sub-wire of the second section of wire part are connected to each other, a and b are positive integers, and a is not equal to b;
    any wire part in the second wire comprises a third section of wire part and a fourth section of wire part, the third section of wire part and the fourth section of wire part each comprise at least two strands of sub-wires, a c-th strand of sub-wire of the third section of wire part and a d-th strand of sub-wire of the fourth section of wire part are connected to each other, c and d are positive integers, and c is not equal to d.

2. The wireless charging coil according to claim 1, wherein the first wire comprises M turns of coils, the second wire comprises M turns of coils, and M is an integer greater than zero.

3. The wireless charging coil according to claim 2, wherein each turn of coil in the first wire comprises a first coil part and a second coil part, and each turn of coil in the second wire comprises a third coil part and a fourth coil part; and the first coil part is comprised in the first wire part, the second coil part is comprised in the second wire part, the third coil part is comprised in the third wire part, and the fourth coil part is comprised in the fourth wire part.

4. The wireless charging coil according to claim 1, wherein a length of the first wire part is the same as a length of the second wire part; and a length of the third wire part is the same as a length of the fourth wire part.

5. The wireless charging coil according to claim 1, wherein the first wire comprises at least two first wire parts and at least two second wire parts, and any two adjacent wire parts of the first wire are different wire parts.

6. The wireless charging coil according to claim 1, wherein the second wire comprises at least two third wire parts and at least two fourth wire parts, and any two adjacent wire parts of the second wire are different wire parts.

7. A terminal device, comprising a wireless charging coil, wherein the wireless charging coil comprises a first wire and a second wire, the first wire and the second wire are both spirally wound into coils;

the first wire comprises a first wire part and a second wire part that are connected to each other, and the second wire comprises a third wire part and a fourth wire part that are connected to each other;

the first wire part is located in a first layer, the second wire part is located in a second layer, the third wire part is located in the first layer, and the fourth wire part is located in the second layer; and the first layer and the second layer are two adjacent layers;

any wire part in the first wire comprises a first section of wire part and a second section of wire part, the first section of wire part and the second section of wire part each comprise at least two strands of sub-wires, an c-th strand of sub-wire of the first section of wire part and a b-th strand of sub-wire of the second section of wire part are connected to each other, a and b are positive integers, and a is not equal to b;

any wire part in the second wire comprises a third section of wire part and a fourth section of wire part, the third section of wire part and the fourth section of wire part each comprise at least two strands of sub-wires, a c-th strand of sub-wire of the third section of wire part and a d-th strand of sub-wire of the fourth section of wire part are connected to each other, c and d are positive integers, and c is not equal to d.

8. The terminal device according to claim 7, wherein the first wire comprises M turns of coils, the second wire comprises M turns of coils, and M is an integer greater than zero.

9. The terminal device according to claim 8, wherein each turn of coil in the first wire comprises a first coil part and a second coil part, and each turn of coil in the second wire comprises a third coil part and a fourth coil part; and the first coil part is comprised in the first wire part, the second coil part is comprised in the second wire part, the third coil part is comprised in the third wire part, and the fourth coil part is comprised in the fourth wire part.

10. The terminal device according to claim 7, wherein a length of the first wire part is the same as a length of the second wire part; and a length of the third wire part is the same as a length of the fourth wire part.

11. The terminal device according to claim 7, wherein the first wire comprises at least two first wire parts and at least two second wire parts, and any two adjacent wire parts of the first wire are different wire parts.

12. The terminal device according to claim 7, wherein the second wire comprises at least two third wire parts and at least two fourth wire parts, and any two adjacent wire parts of the second wire are different wire parts.

* * * * *